Aug. 28, 1956 W. H. SMITH 2,760,658
SELF-UNLOADING VEHICLE BODY
Filed Jan. 14, 1954 2 Sheets-Sheet 1

WILLIAM H. SMITH
INVENTOR.

BY James L. Givnan
ATT'Y

Aug. 28, 1956 W. H. SMITH 2,760,658
SELF-UNLOADING VEHICLE BODY
Filed Jan. 14, 1954 2 Sheets-Sheet 2

WILLIAM H. SMITH
INVENTOR.

BY James L. Girvan
ATTY

# United States Patent Office 2,760,658
Patented Aug. 28, 1956

2,760,658
SELF-UNLOADING VEHICLE BODY
William H. Smith, Portland, Oreg.
Application January 14, 1954, Serial No. 404,041
1 Claim. (Cl. 214—82)

This invention relates to improvements in vehicle bodies and more especially to truck bodies of the type used for transporting loads of various kinds of comminuted material such as sawdust, wood chips, sand, grain, garbage, and the like.

It is one of the principal objects of the invention to provide a power driven wall movable forwardly and rearwardly within the truck body and controlled by a single manually actuated shifting lever for starting the movement at either end and the provision of means for automatically stopping the movement at the other end.

A further object is the provision of means for stabilizing the movable wall throughout its rearward load-discharging travel against twisting or binding under loads imposed unevenly transversely of the wall.

The foregoing and other objects and advantages will become apparent as the invention is more fully hereinafter described in the following specification, illustrated in the accompanying drawings and finally pointed out in the appended claim.

In the accompanying drawings:

Figure 4 is a sectional side view of Figure 3 taken approximately along the line 4—4 in Figure 3.

Figure 1:
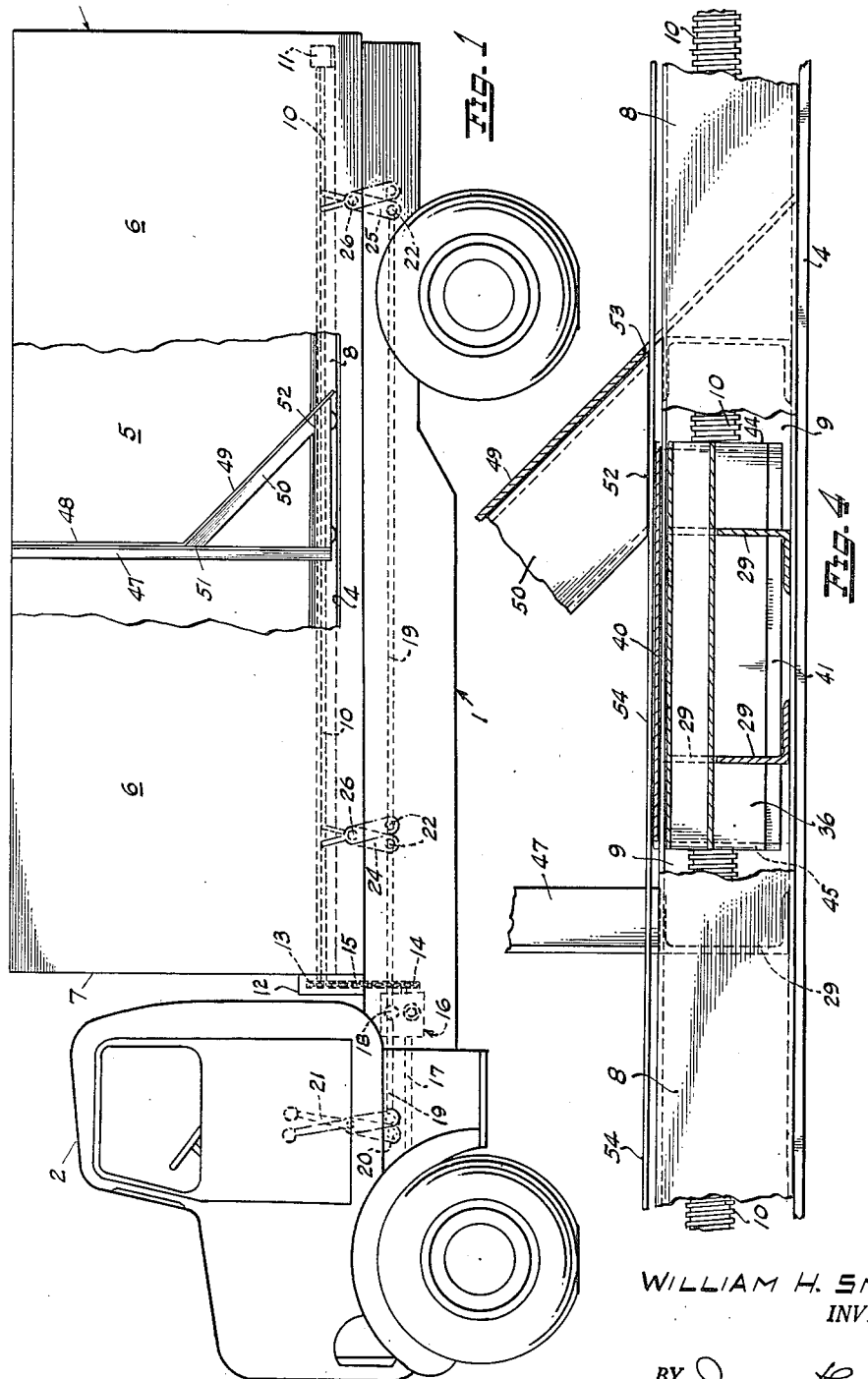
Figure 1 is a side view of a truck with a fragment of the side wall of its body broken away and showing a load-discharging mechanism made in accordance with my invention operatively disposed on the interior of the body.
Figure 2:
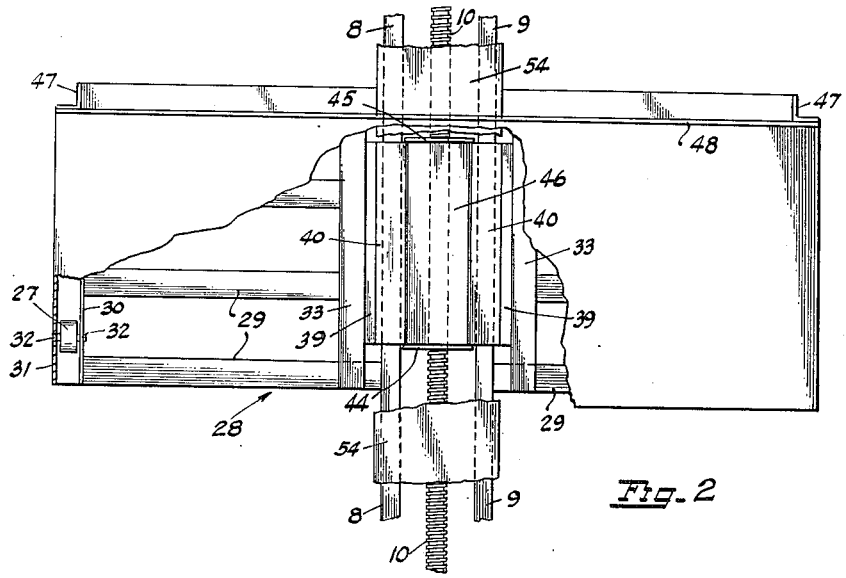
Figure 2 is an enlarged top plan view of a movable load-discharging wall with a fragment of its lower portion broken away to reveal underlying parts and also showing a fragment of track and fragments of a cover strip for the track and certain of said underlying parts.
Figure 3:
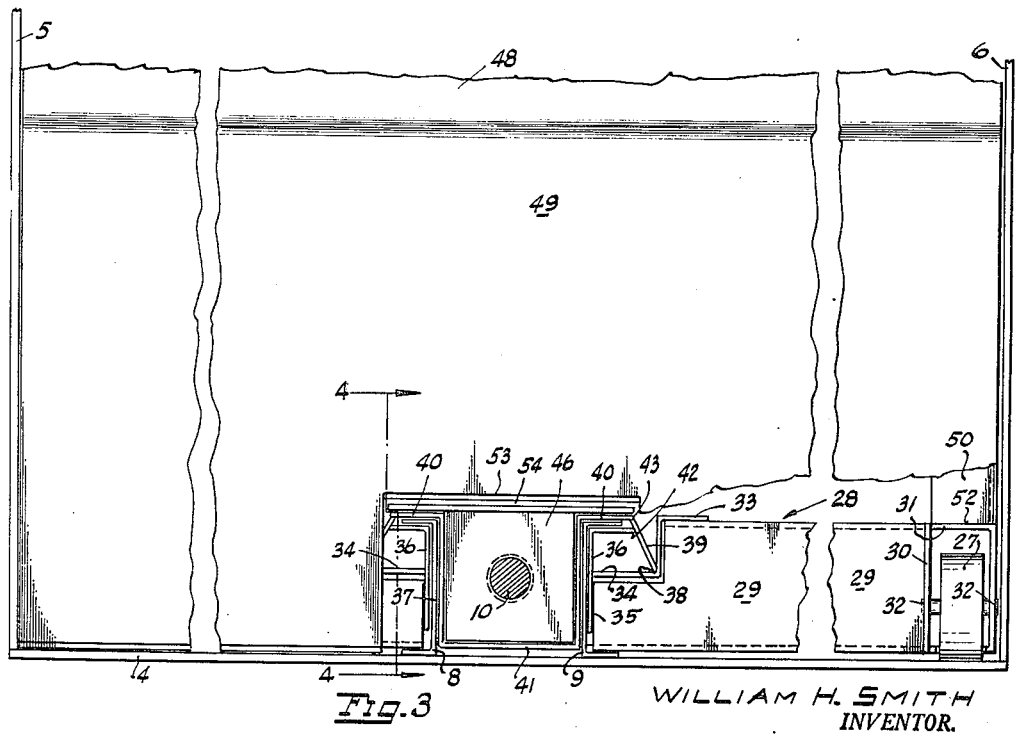
Figure 3 is an enlarged fragmentary front view of Figure 2 and showing in addition thereto the floor and fragments of the side walls of the truck body.

Referring now more particularly to the drawings:

In Figure 1 reference numeral 1 indicates an engine-driven truck chassis having a driver's cab 2 and body 3 mounted thereon in the usual manner. The truck body, which includes a floor 4, side walls 5—6 and front wall 7, may be of square or rectangular shape in cross-section and open at its top or closed by a flat or curved roof.

The floor of the truck body is provided with two centrally located tracks in the form of channel irons 8 and 9 secured thereto by welding or the like and extending substantially throughout the length of the floor with their web plates in spaced apart relation to each other. Arranged centrally between the tracks is a screw shaft 10 whose one end is rotatably mounted in a radial-thrust bearing disposed within a housing 11 secured to the floor of the body at the rear end thereof. The opposite or forward end of the screw shaft terminates within a housing 12 and is provided with a driven sprocket wheel 13 operatively connected to a driving sprocket wheel 14 by a chain 15. The sprocket 14 is connected to and operated by power transmission means generally indicated at 16 which is connected to and driven by one end of a shaft 17 whose opposite end is operatively connected to the engine of the truck by any approved type of coupling (not shown).

The power transmission means is connected as at 18 to a horizontally movable shifting rod 19 pivotally attached at its forward end as at 20 to a manually operable shifting lever 21 disposed within the driver's cab 2. The rod 19 is also pivotally connected as at 22 and 23 to the bottom ends of shifting levers 24—25, respectively, which are located between the tracks 8 and 9 and pivotally attached as at 26 to rods extending transversely in the frame of the truck chassis or by any other approved means.

Disposed within the truck body and movable forwardly and rearwardly along the floor thereof by means of supporting wheels 27 along both of its sides is a carriage generally indicated at 28 and comprising a plurality of spaced apart horizontal beams 29 interconnected by end plates 30 and beams 31 of channel section secured to the plates. The carriage wheels are journaled as at 32 in the plates 30 and channel beams 31. The inner ends of the horizontal beams 29 of the carriage are secured by welding or the like to at least one flange 33 of Z beams 34 and also to the vertical flanges 35 of angle irons 36 disposed on the outside of the flanges 37 of the tracks 8 and 9. The Z beams are welded at 38 to one longitudinal edge of diagonal plates 39 whose opposite marginal edges are welded to the horizontal flanges of the angle irons 36 and also to the outer edge of flanges 40 of a box 41 as at 42—43, respectively. The box is closed at both of its ends by end plates 44—45 and thus provides a housing for a traveler block 46 threadedly mounted on the screw shaft 10. From the foregoing it will be apparent that the carriage in its entirety will move forwardly or rearwardly along the floor of the truck body upon rotation of the screw shaft by means of the chain drive 15 as aforesaid. The flanges 40 of the box and the horizontal flanges of the angle irons 36 slide freely along the tracks above and below the top flanges of the tracks respectively.

Welded to the forward ends of the end beams 31 of the carriage are two vertical members 47 of angle iron to which is welded or bolted the upper portion of a wall 48 whose lower portion 49 is bent rearwardly and downwardly as shown and secured to diagonal supports 50 which are secured at their ends as at 51—52 to the end beams 31 and to the vertical members 47, respectively. The bottom mid-portion of the lower portion of the wall is cut out as at 53 to slidably embrace the tracks 8 and 9 and a plate 54 covering the tracks throughout their length and attached only at both of its ends to the ends of the tracks in any approved manner. The cover plate also overlies the flanges 40 of the box 41 (see Figure 4) but being yieldable in a vertical direction will not interfere with the forward and rearward travel of the box along the tracks 8 and 9. Contents of the vehicle body are thus prevented from entering the space between the tracks and obstructing the movement of the box or the operation of the screw shaft. The top of the vertical portion of the wall is shaped to correspond with the underside of the roof, flat, curved, or otherwise, with minimal clearance which is also provided between the side edges of the wall and the inside walls of the truck and the bottom edge of the wall and the floor of the truck body for maximum efficiency in discharging a load as the wall is forced rearwardly through the medium of its carriage and the traveler block.

The traveler block and its related parts are of sufficient length to firmly stabilize the carriage against twisting or binding under any uneven load distribution transversely of the wall carried by it.

Before loading a truck body equipped with my invention, the shifting lever 21 is first moved into the dotted line position shown in Figure 1 which will also move the levers 24 and 25 into their dotted line positions and at the same time put the screw shaft 10 into operation. Rotation of the screw shaft in one direction through the medium of the traveler block will move the carriage and its wall structure forwardly. The spacing of the forward lever 24 from the front wall 7 of the truck is such that its top end will be struck by the forward end of the traveler block and thereby moved into a vertical or neutral position to stop rotation of the screw shaft just as the wall structure 47—48 comes to rest against the front wall 7 of the truck body. To discharge the load from the truck it is merely necessary to move the shifting lever 21 and levers 24—25 into their broken line positions which will cause reverse rotation of the screw shaft 10 which will continue to rotate until the rear end of the traveler block now moving rearwardly strikes the upper end of the lever 25 and moves it into a vertical neutral position to automatically stop rotation of the screw shaft just as the bottom edge of the lower portion 49 of the wall 48 reaches the rear edge of the floor of the truck body.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A vehicle body having a floor, a front wall and side walls, a pair of tracks in the form of channel irons superimposed upon and secured to the floor and extending throughout the length thereof with their web-plates in parallel spaced relation to each other, an elongated rectangular box slidably mounted between the tracks, an elongated rectangular traveler block loosely disposed within the box, a single power driven screw shaft rotatably mounted between said tracks full length thereof and threadedly engaged with said traveler block for propelling the carriage lengthwise of the floor upon rotation of the screw shaft, one end of said screw shaft terminating in a thrust bearing at the rear end of said floor and being connected at its opposite end to power transmission means for selective operation, a carriage secured to said box and extending laterally therefrom and supported by rollers along both of its sides, a substantially vertical wall mounted upon the carriage and having its lower portion extending rearwardly of the carriage into sliding contact with said floor whereby said carriage and wall carried thereby will be stabilized by the traveler block against twisting or binding under uneven load distribution transversely of the wall, and a vertically yieldable cover plate disposed upon the top of said tracks and overlying said box whereby the contents of said vehicle body will be prevented from entering the space between said tracks and obstructing movement of the box and the operation of said screw shaft.

References Cited in the file of this patent

UNITED STATES PATENTS

| | | |
|---|---|---|
| 1,567,690 | Weaver | Dec. 29, 1925 |
| 1,769,939 | Berasi | July 8, 1930 |
| 2,002,993 | Ehrick et al. | May 28, 1935 |
| 2,166,846 | McCalley | July 18, 1939 |
| 2,258,988 | Le Laurin | Oct. 14, 1941 |
| 2,339,360 | Sicard | Jan. 18, 1944 |
| 2,557,003 | Laurin | June 12, 1951 |
| 2,569,161 | Golay | Sept. 25, 1951 |